Oct. 21, 1930.  H. L. GILMORE  1,779,361
MOVABLE HEADLIGHT
Filed Jan. 4, 1929   2 Sheets-Sheet 1
Fig. 1.
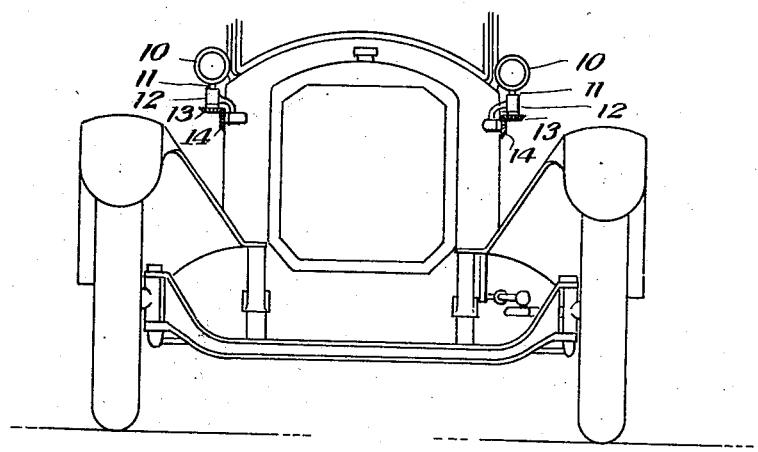
Fig. 5.
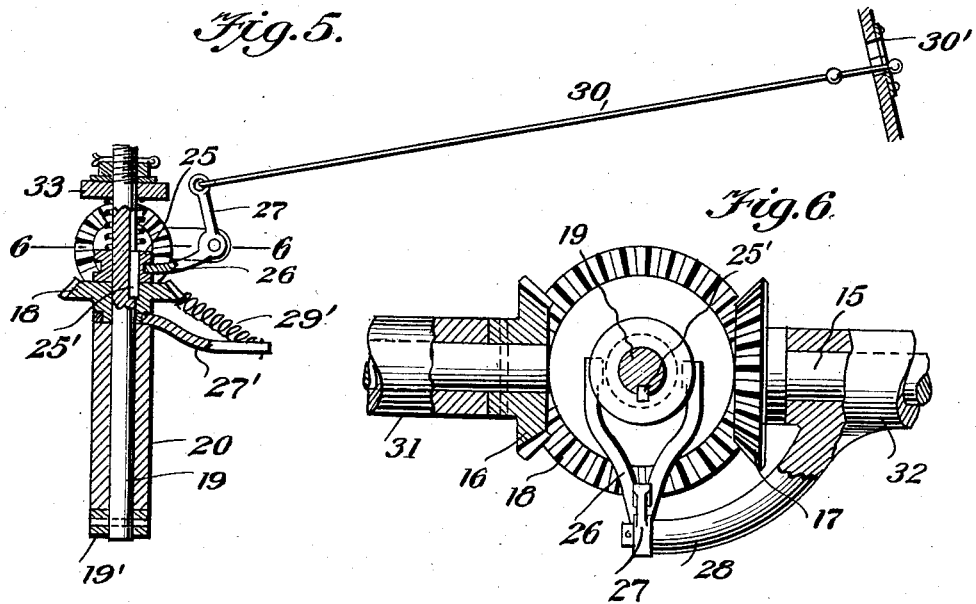
Fig. 6.
Harley L. Gilmore
INVENTOR
BY Victor J. Evans
ATTORNEY

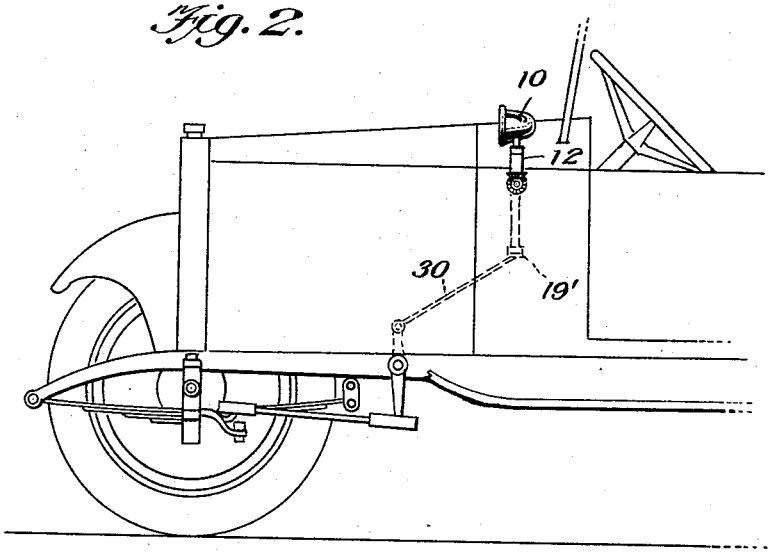
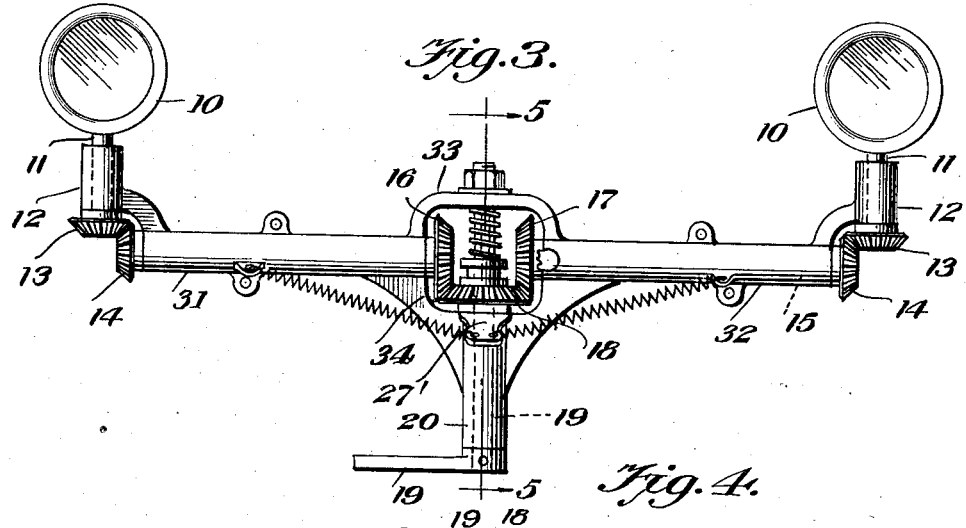
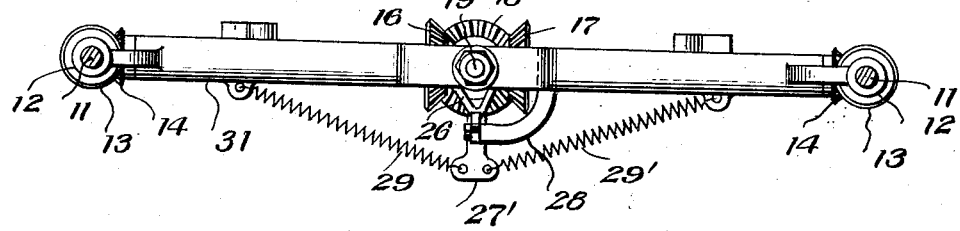

Patented Oct. 21, 1930

1,779,361

UNITED STATES PATENT OFFICE

HARLEY L. GILMORE, OF CAMPBELLSVILLE, KENTUCKY

MOVABLE HEADLIGHT

Application filed January 4, 1929. Serial No. 330,213.

The object of this invention is to provide for the control of the headlights or spotlights of a motor vehicle by employing a special type of gearing and connection therefor, this gearing being normally and automatically operated from the steering gear, but adapted to remain neutral for directing the light rays straight ahead, when desired and to be placed in neutral position by the release of the key of one of the gear wheels when a collar mounting the key is engaged and shifted by manually operated means.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:—

Figure 1 is a view showing the manner of mounting the lights on a motor vehicle, the view being in front elevation.

Figure 2 is a fragmentary view in side elevation showing a portion of the vehicle and the connections with the steering gear.

Figure 3 is a view of the unit mounting the lamp casings and mounting the special controlling devices therefor, the lower element of this view being adapted for automatic control by the standard steering mechanism.

Figure 4 is a view in top plan of the special gearing employed, and showing the means for placing the gearing in active or neutral position.

Figure 5 is a section on line 5—5 of Figure 3.

Figure 6 is a section on line 6—6 of Figure 5.

The lamp casings are designated 10, and are rigidly mounted on spindles or standards 11 supported in brackets 12 and controlled by gear wheels 13 on the spindles, these gear wheels meshing with gear wheels 14 on aligned horizontal shafts 15.

The shafts 15 carry gear wheels 16 and 17 on the inner ends respectively, and a gear wheel 18 is rigid on shaft 19 within a vertical tubular shaft 20, this gear wheel 18 being in constant mesh with gear wheels 16 and 17.

The lower end of element 19 has fixed thereon an arm 19' adapted for operative connection with the standard steering mechanism, and on the right hand side of the car.

Gear wheel 18 formed with or carried by tubular shaft 20 rotates the spindles of the headlights or spotlights, under normal conditions, from the steering gear, but said gear wheel 18 is keyed to element 19, the key being carried by a slidable collar 25 controlled by a fork 26 of arm 27. This arm is mounted for rocking movement on stationary arm 28, and the springs 29—29' hold the arm 27' in middle position, when the lamps are to be in normal position for throwing the light straight ahead.

Wheel 18 is to be controlled by arm 27' (with the mechanism in neutral position), when key 25' is lifted by angle arm 27 manually controlled by rod 30 having engaging means thereon cooperating with slotted plate 30'.

The shaft housings 31, 32 are connected by frame elements 33, 34, and this structure may constitute a single unit.

Having described the invention what is claimed is:

1. A device of the character set forth comprising a support including a horizontal portion and a pair of vertical portions at the outer ends of the horizontal portion and an intermediate vertical portion, horizontal shafts journaled in said horizontal portion and having their inner ends spaced, headlamps journaled to the vertical portions, means for connecting the outer ends of the shafts to the headlamps, a vertical shaft journaled in the intermediate portion and disposed between the inner ends of the horizontal shafts and connected to a steering mechanism, gears secured to the horizontal shafts, a control gear meshing with said gears and mounted on the vertical shaft, a manual control means for connecting and disconnecting the control gear to the vertical shaft, an arm secured to the vertical shaft, and tension means connected to the arm to position the headlamps straight ahead when disconnected from the steering mechanism by said control means.

2. A device of the character set forth including a pair of journaled lamps, a support, shafts journaled to said support, means connecting the lamps to the shafts, gears secured to said shafts, a vertical shaft journaled to said support and connected to a steering mechanism, a control gear mounted on said vertical shaft and meshing with said gears, a grooved sleeve slidable on said vertical shaft, a key securing said sleeve to the vertical shaft against rotation relative thereto and adapted to be moved with said sleeve to connect and disconnect the control gear with the vertical shaft, a forked arm pivoted to the support and having the forked portion positioned in the goove of the sleeve, and a control means connected to the arm.

In testimony whereof I affix my signature.

HARLEY L. GILMORE.